Patented Mar. 10, 1931

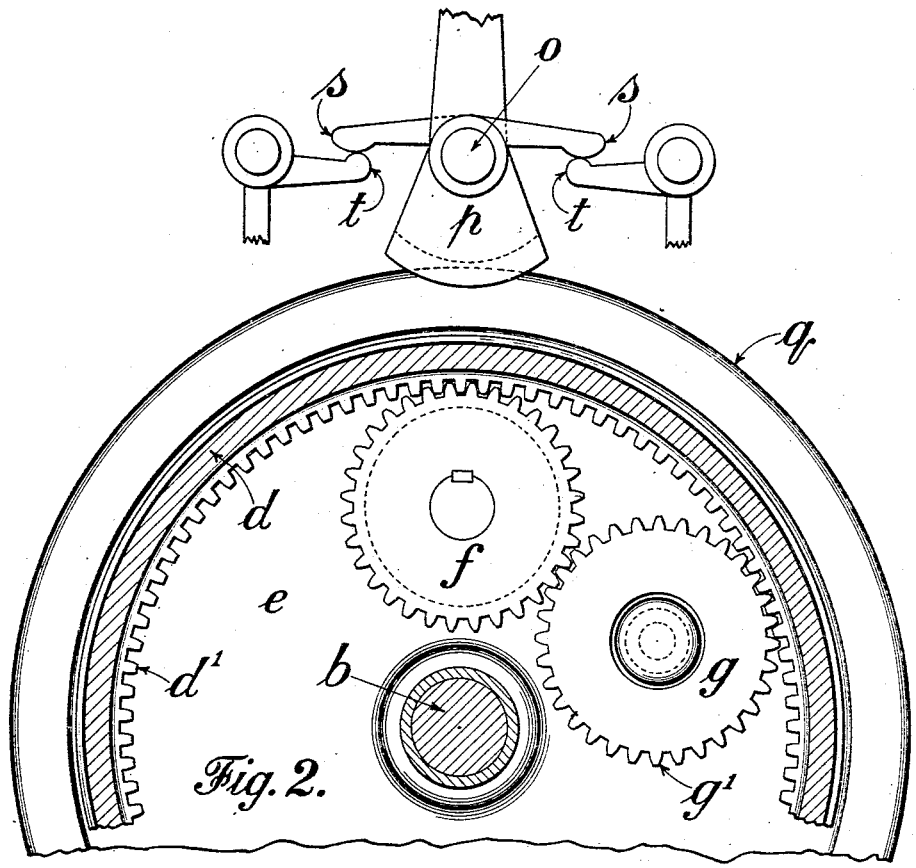

1,795,981

UNITED STATES PATENT OFFICE

JOHN WARD, OF BLACKBURN, ENGLAND

CONSTANT-MESH VARIABLE-SPEED GEAR

Application filed October 8, 1929, Serial No. 398,230, and in Great Britain October 16, 1928.

This invention refers to a constant-mesh, variable speed gear, chiefly as used with motor-propelled vehicles.

The object of the invention is to provide a constant-mesh variable speed gear of improved and simplified construction, and one in which few parts are required to be moved to effect a change of speed, forward or reverse.

According to the invention, the improved variable speed gear comprises a spur wheel, an internally toothed drum, a pair of constant-mesh pinions carried by an intermediate disc, brake mechanism for said disc and means for engaging either one or both of the pinions with the internally toothed drum to provide alternatively a geared forward, and a locked gear train with or without a reverse gear. Various methods of obtaining intermediate forward speeds may be adopted, and one method comprises a third pinion in constant driving connection with one of the pinions of the said pair of pinions and gearing with a second internally toothed gear drum with brake mechanism, to provide a second or intermediate forward speed. Means may also be provided for facilitating synchronizing of the gearing for changing to the locked or direct drive.

Where more than two forward intermediate speeds are desired, the improved gear may also comprise one or more additional engine-driven spur wheels, and one or more additional internally toothed gear drums and additional pinions to engage said drums, the axle of each additional pinion being carried by the preceding drum.

Upon the accompanying drawing:—

Fig. 2 is an end elevation of Fig. 1 with the cover removed.

Figure 1:
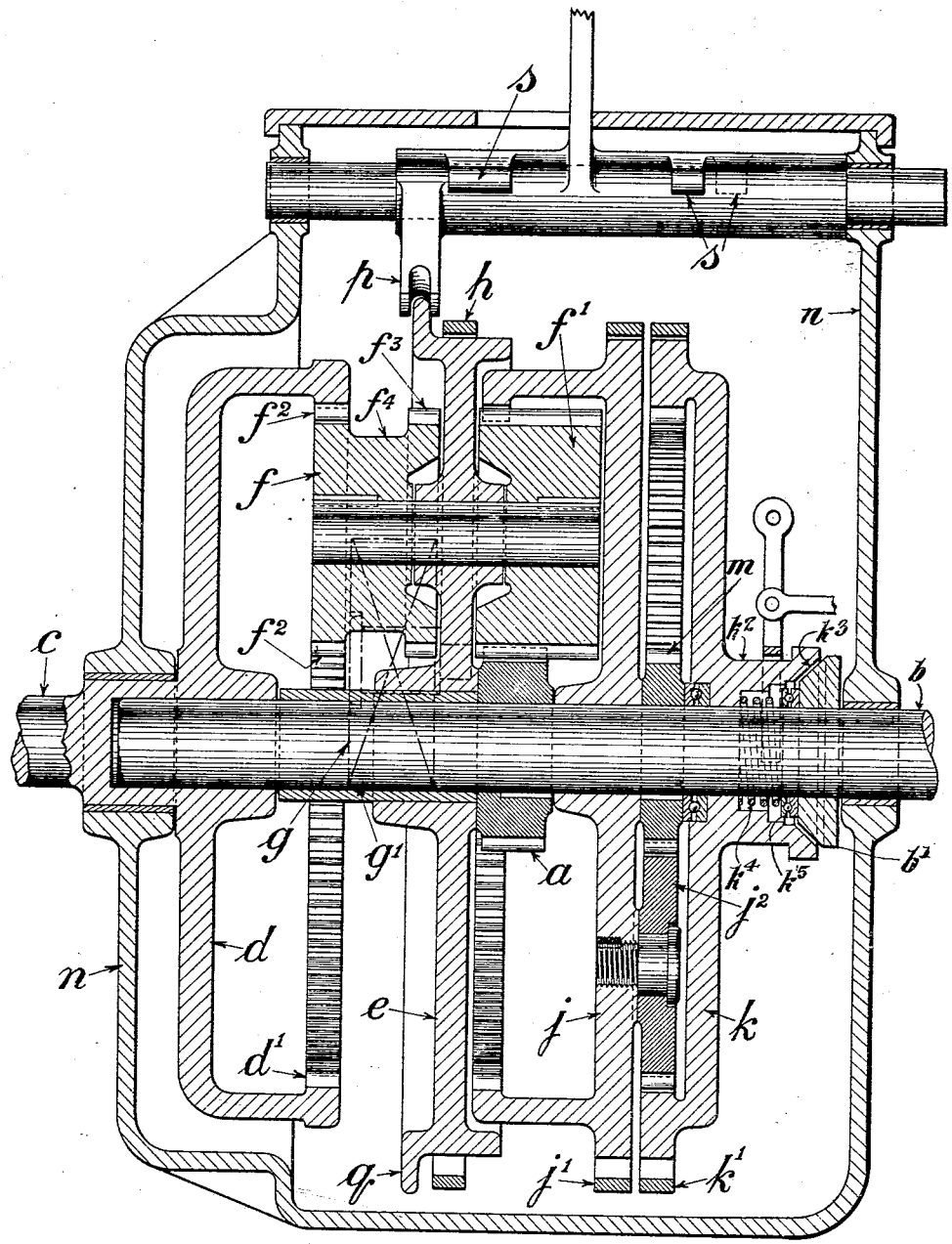
Fig. 1 is a sectional elevation of one example of gear made in accordance with the invention.

As illustrated, the improved gear comprises a spur wheel $a$ keyed to the driving shaft $b$. Integral with the driven shaft $c$ is an internally toothed gear drum $d$. Alongside such drum $d$ is a sliding intermediate disc $e$, and by such intermediate disc are carried the axles of two constantly meshing pinions $f$ and $g$, of equal diameter. The axle of the pinion $f$ is carried through the disc and a further and equal broad width pinion $f^1$ provided thereon meshing with the spur wheel $a$. The pinion $f$ has two toothed portions $f^2$ and $f^3$ of equal width to the toothed portion $d^1$ of the drum $d$ and separated by a space $f^4$ wider than such toothed portions. The pinion $g$ has one wide toothed portion $g^1$, part of which is constantly in mesh with the portion $f^3$ and the other part of which registers with the space $f^4$. Such latter part of the toothed portion $g^1$ and the toothed portion $f^2$ are adapted to selectively engage with the toothed portion $d^1$ by sliding the disc. The sliding disc $e$ is provided with brake mechanism $h$ whereby it may be held stationary, or made free at will. A further internally toothed drum $j$ is provided, rotatably mounted on the shaft $b$, meshing with the pinion $f^1$, and provided with brake mechanism $j^1$. On such drum $j$ is a pinion $j^2$ which meshes with a third toothed drum $k$ having brake mechanism $k^1$ and also meshing with an additional spur wheel $m$ keyed to the shaft $b$. The gear is enclosed within a casing $n$ in which is slidably mounted a selector rod $o$, having an arm $p$ adapted to engage a flange $q$ on the sliding disc $e$ so as to slide the same, and tappets $s$ are adapted to engage and operate rockers $t$ for the respective brake mechanisms when a rocking motion is given to the selector rod.

The operation of the gear is as follows:— For reverse, the sliding disc $e$ is positioned as shown in Fig. 1, and the brake mechanism for the disc is brought into action to check rotation of the disc. For 1st forward speed, the sliding disc is moved to bring the toothed portion $g^1$ of the pinion $g$ into mesh with the toothed portion $d^1$ of the drum $d$ at the same time taking the toothed portion $f^2$ of the pinion $f$ out of engagement with the toothed portion $d^1$ of the drum $d$. The drive is obtained progressively as the brake mechanism for the disc $e$ is applied to check its rotation.

For 2nd and 3rd forward speed, the sliding disc is moved another step but the relative meshing of the pinions is unchanged the purpose of the movement being to enable the selector rod to engage different rockers for the several braking mechanisms. In this position, rocking the selector rod one way applies the brake mechanism of the drum $j$ giving the 2nd forward speed, while in the other direction it applies the brake for the drum $k$ to give the 3rd forward speed.

For top gear the selector is moved further to bring the toothed portion $f^3$ into engagement with the toothed portion $d^1$ of the drum $d$ when the gears will be locked.

The brake mechanism is shown diagrammatically as consisting of brake bands and drums, but any suitable clutch or brake mechanism may be used. The arm $p$ would preferably be formed as a double-armed grooved lever extending to opposite sides of the disc $e$, and of such design as will maintain contact between $p$ and $q$ when the selector rod $c$ is rocked.

The precise manner of slidably operating the pinions may vary. The pinion-carrying disc and the pinions carried by such disc preferably slide as one, said pinions being of such width laterally (one of them being also circumferentially grooved) and so mounted as to effect the desired gear variations.

The putting on of more than one brake at one time will provide a braking system for the driving and driven shafting, that is, for the whole of the drive.

In order to facilitate the interlocking of the pinion $f$ with the drum $d$ for top gear drive and prevent any possibility of gear clashing when such interlocking takes place, the wheel $j$ (in the case of a 3-speed box) or, the wheel $k$, (in the case of a 4-speed box) may be made free to slide laterally, and may be provided with a miniature clutch facing to actuate upon a companion clutch facing fixed either directly upon the shaft $b$ or upon the side surfaces of the spur wheel $a$, or $m$ respectively.

As shown in Fig 1, the drum $k$ is made with an extension $k^2$ having a conical clutch face $k^3$, and enlarged around the shaft to house a spring $k^4$ and thrust race $k^5$. On the shaft is provided a clutch member $b^1$.

The gear is applicable for many uses, as for example, on a motor-cycle and where as in this case, a reverse gear is not required the toothed portion $f^2$ of the pinion $f$ may be omitted.

The improved gear provides a direct drive which is positive and needs no clutching device such as has previously been provided.

What I claim is:—

1. In an epicyclic variable speed gear having a sun wheel and an internally toothed drum keyed to shafts and together forming the main members of the gear, and planetary pinions carried on an intermediate member provided with brake mechanism and selectively and slidably meshing with and connecting the said main members, a pair of planetary pinions having toothed portions part of which are in constant mesh with each other and each having another part of the toothed portion not in mesh, the said planetary pinions being slidable together relatively to one of the said main members so that one of the said other parts of their toothed portions or the meshing parts of the said planetary pinions may be engaged with such main member to give forward, reverse or locked drive respectively.

2. In an epicyclic variable speed gear having a sun wheel and an internally toothed drum keyed to shafts and together forming the main members of the gear, and planetary pinions carried on an intermediate member provided with brake mechanism, and selectively and slidably meshing with and connecting the said main members, a pair of planetary pinions having toothed portions part of which are in constant mesh with each other and each having another part of the toothed portion not in mesh, the said planetary pinions being slidable together relatively to one of the said main members, so that one of the said other parts of their toothed portions or the meshing parts of the said planetary pinions may be engaged with such main member to give forward, reverse or locked drive respectively, in combination a second internally toothed drum connected by planetary pinions to the sun wheel aforesaid and brake mechanism for said second toothed drum, whereby further gear ratios may be provided.

3. An epicyclic gear according to claim 2, characterized in that the second toothed drum meshes with one of the slidable planetary pinions in mesh with the sun wheel, as set forth.

4. In an epicyclic variable speed gear having a sun wheel and an internally toothed drum keyed to shafts and together forming the main members of the gear, and planetary pinions carried on an intermediate member provided with brake mechanism, and selectively and slidably meshing with, and connecting the said main members, a pair of planetary pinions having toothed portions part of which are in constant mesh with each other, and each having another part of the toothed portion not in mesh, the said planetary pinions being slidable together relatively to one of the said main members, so that one of said other parts of their toothed portions or the meshing parts of the said planetary pinions may be engaged with such main member to give forward, reverse or locked drive respectively, in combination, a second internally toothed drum connected by planetary pinions to the sun wheel aforesaid, brake mechanism for said second toothed drum, whereby further gear ratios may be provided, a third internally toothed drum, a second sun wheel keyed to the same shaft as the first sun wheel planetary wheels carried on the second toothed drum and meshing with the said second sun wheel and third internally toothed drum and brake mechanism for the said third drum, so as to provide further gear ratios, as set forth.

5. An epicyclic gear according to claim 4, characterized in that the second toothed drum meshes with one of the slidable planetary pinions in mesh with the first sun wheel, as set forth.

6. An epicyclic variable speed gear according to claim 1, characterized in that the planetary pinions of the pair in constant mesh are of unequal width one of them having two single width portions relative to the width of teeth on the internally toothed drum, separated by a space of single width and the other having a double width portion, half of which is in mesh with one of the single width portions aforesaid, and the other half overlapping said single width space, as set forth.

7. An epicyclic variable speed gear according to claim 1, characterized in that the intermediate member is slidably mounted on the driving shaft to provide the sliding movement for the planetary pinions, as set forth.

8. An epicyclic variable speed gear according to claim 1, characterized by coacting clutch parts on the driving shaft and on one of the driving toothed gear drums for synchronizing the said parts preparatory to effecting the engagement of the meshing parts of the said planetary pinions for the locked drive, as set forth.

9. An epicyclic variable speed gear according to claim 1, characterized by clutch mechanism between the last internally toothed drum and the sun wheel shaft for synchronizing the parts preparatory to effecting the engagement of the meshing parts of the said planetary pinions for the locked drive, as set forth.

In testimony whereof I have signed my name to this specification.

JOHN WARD.